United States Patent Office

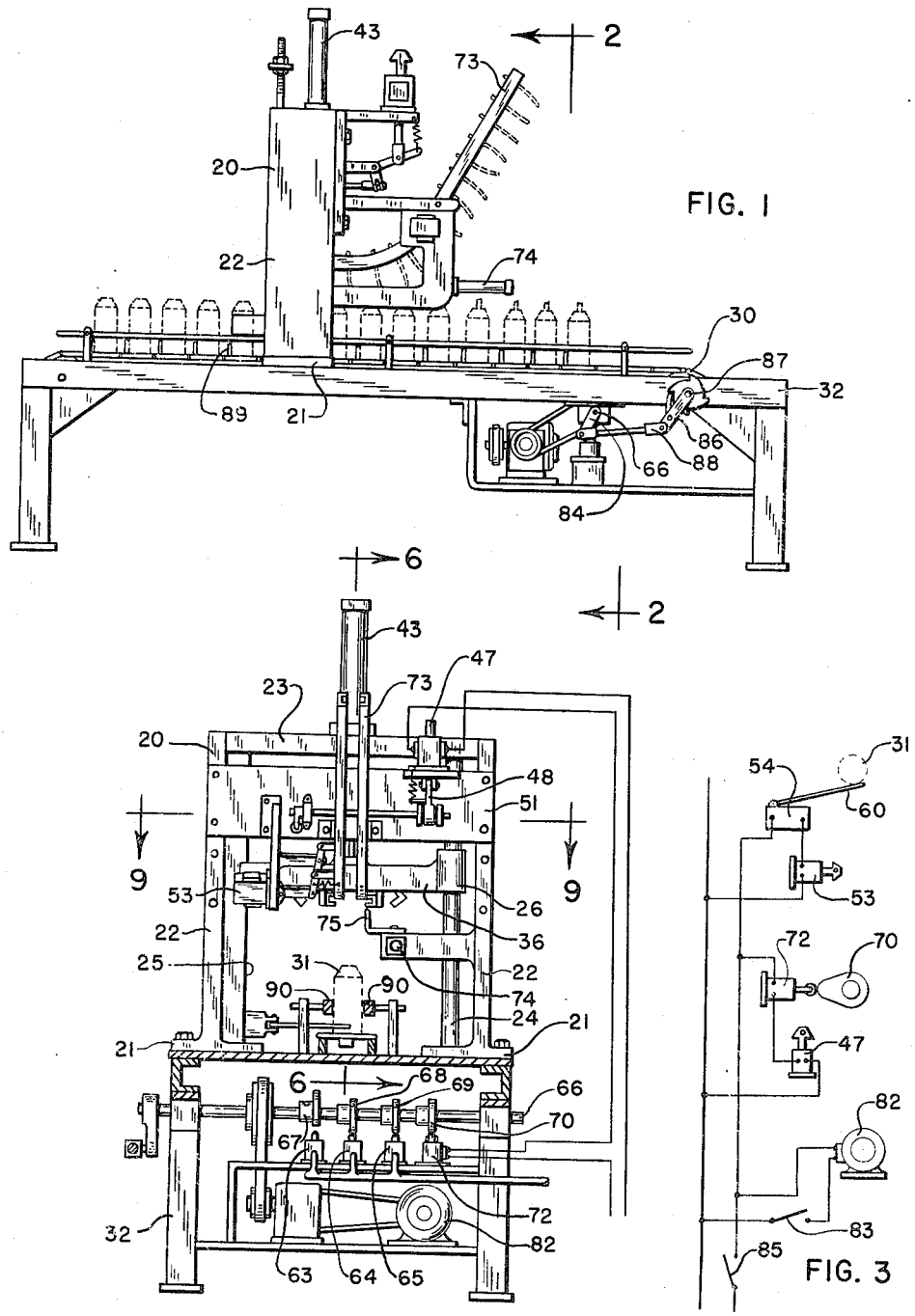

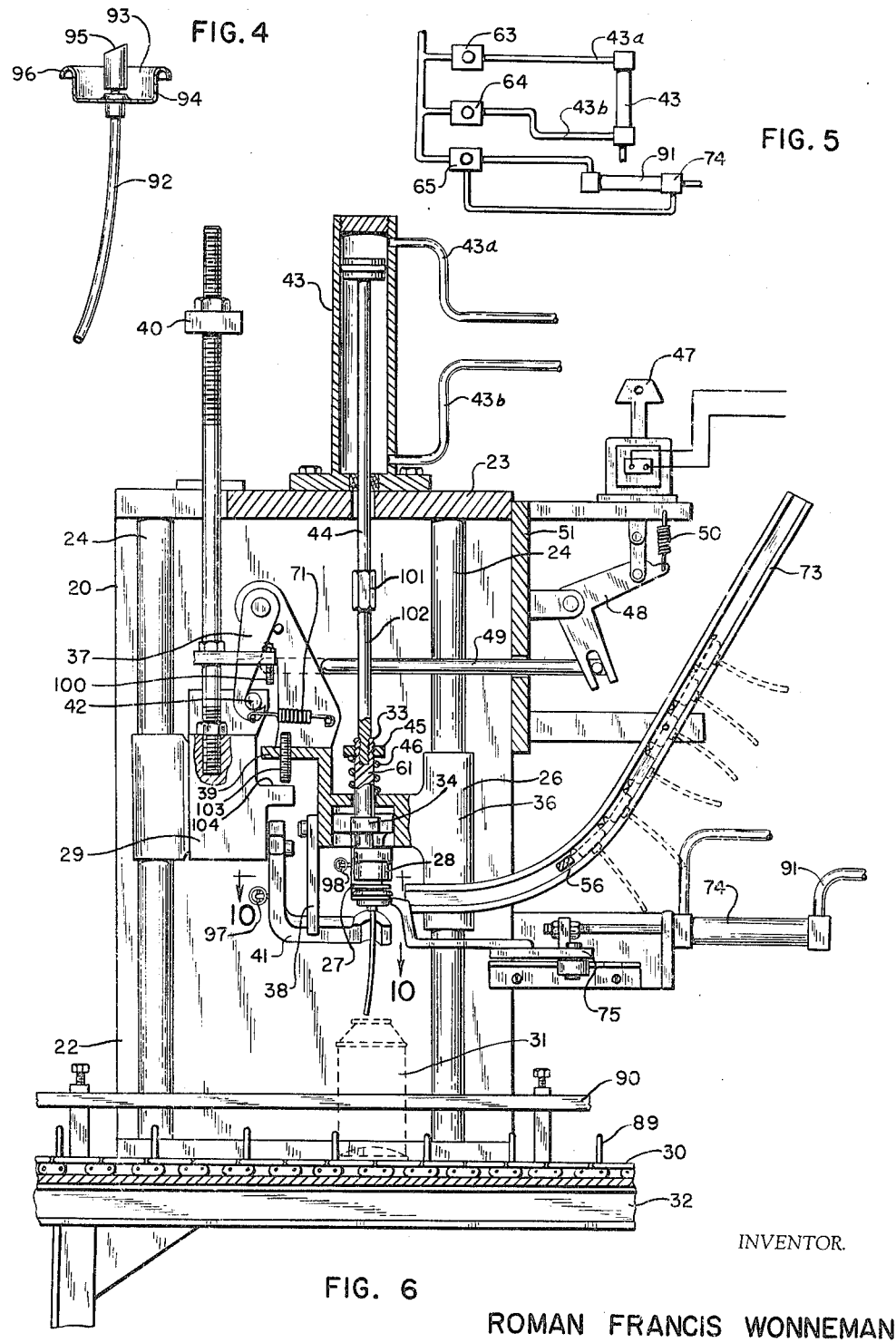

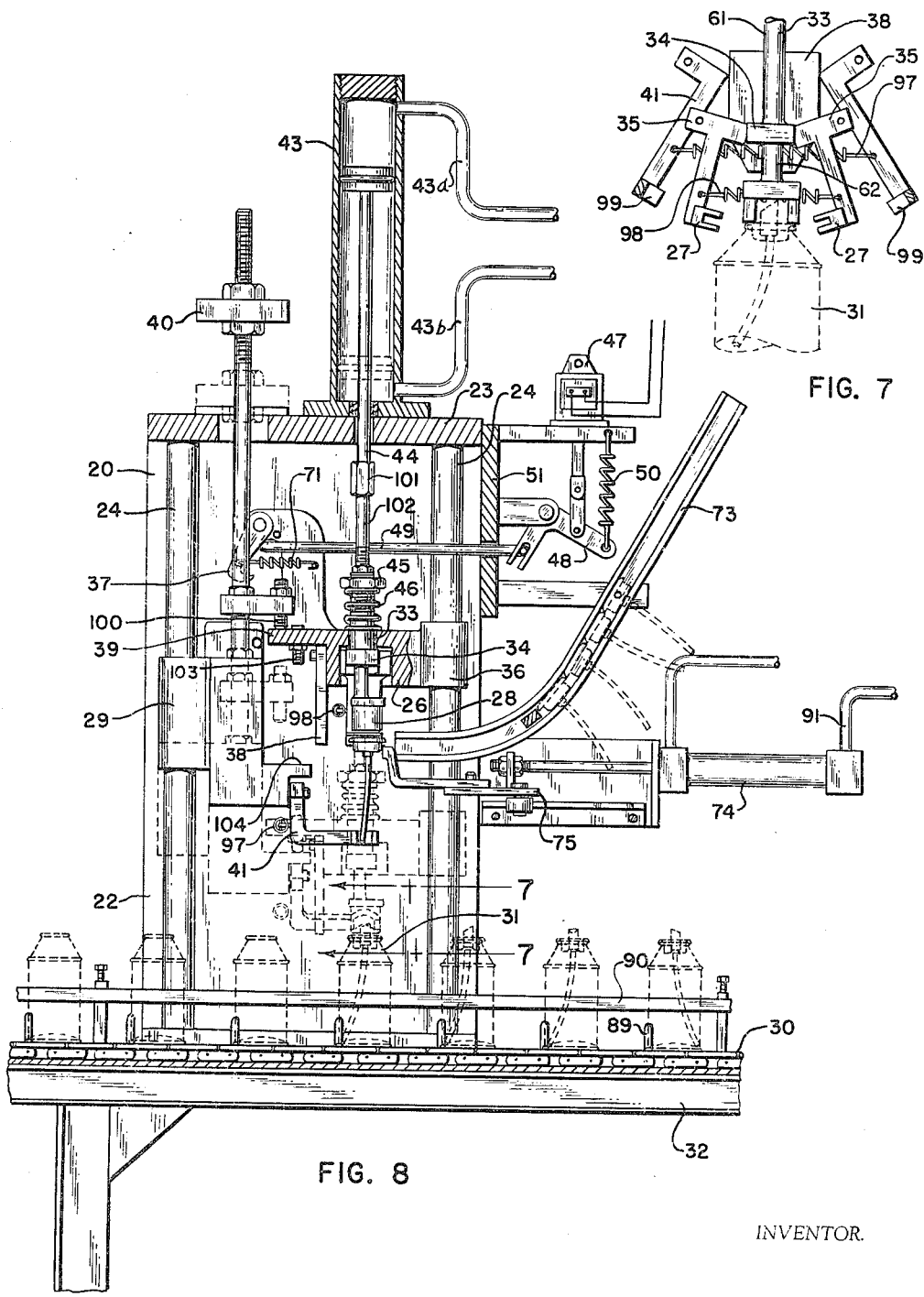

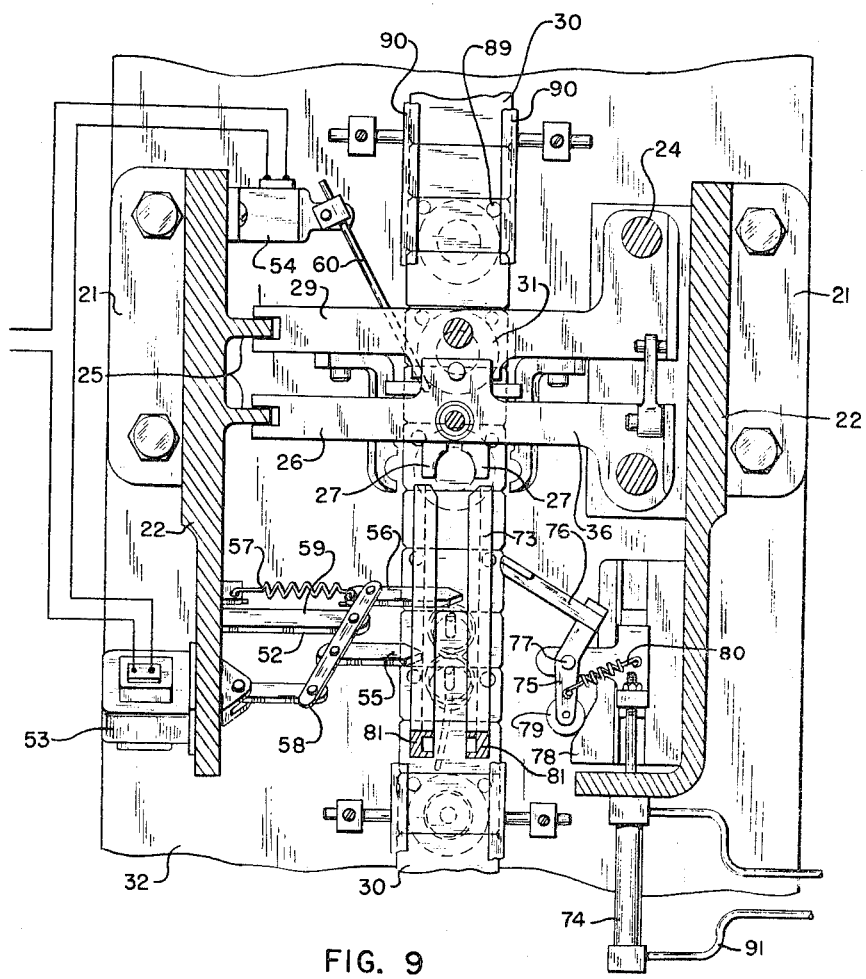
FIG. 9
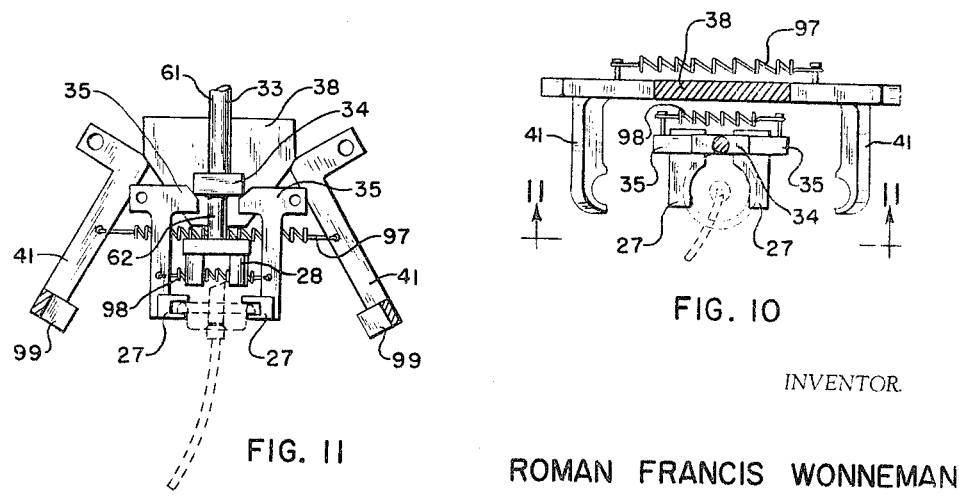
FIG. 11
FIG. 10
INVENTOR.
ROMAN FRANCIS WONNEMAN

3,212,174
Patented Oct. 19, 1965

3,212,174
INLINE APPARATUS FOR ASSEMBLING FLEXIBLE CURVED DIP TUBE CLOSURES TO CONTAINERS
Roman Francis Wonneman, 9621 Harding Ave., Baltimore, Md.
Filed Feb. 21, 1964, Ser. No. 347,075
12 Claims. (Cl. 29—208)

This invention relates in general to apparatus for assembling dip tube closures to containers, and more particularly to inline apparatus for assembling curved dip tube closures of the push button valve type to spray containers in the general manner described in my copending parent application No. 346,453, filed of even date entitled Apparatus for Applying Curved Dip Tube Closures to Containers of which this application is a continuation-in-part.

The principal object of the present invention is to provide apparatus containing the general features of construction and operation of my copending application in a manner in which all parts are in line in superposed relation above the container to which the closures are to be applied and within the lateral confines of the path of movement of said container, leaving the areas on opposite sides of the container path free of and unobstructed by the closure applying mechanism.

A more specific objective of the present invention is the novel conception of a different method of construction and operation of the general system of parts of the machine of my copending application No. 346,453, filed of even date entitled Apparatus for Applying Dip Tube Closures to Containers for applying, gripping and guiding the closures, and especially the manipulating means, and the sequence operating means for the closure gripping member and the tube guide member which lend themselves to a simpler and more compact design suitable for use as an inline superposed structure for applying the closures with a straight line movement, preferably vertically downward, onto the containers that are to receive dip tube closures, and with the possibility of operating the actuating mechanism for the three main parts aforesaid either mechanically, as by cams and cam followers as described in my said copending application or by fluid pressure operation, as by pneumatic means as described herein.

A further important object of the invention is embodied in the closure gripping and tube guiding means, and the sequence operating means the novel combination of which lends to a design suitable for use as an inline superposed apparatus for guiding the dip tube into the container opening, then to release the closure portion of the closure assembly for its gravital movement downward onto the container opening.

A further important object of the invention is to provide selective means and various combinations thereof for initiating the sequence cycle, and for providing the sequence cycle.

A further important object of the invention is to provide means for the positive forced feed of individual closure caps into the grasping or gripping means in sequence with the corresponding operation of the closure applying mechanism in sequence with the feed of the containers for affixing of closures thereto.

In addition to the general objects recited above, the invention has for further objects such other improvements and advantages as may be found to be obtained in the structure and operation hereinafter described or claimed.

The general features of the machine of my aforesaid parent copending application comprises a closure applying member, a closure gripping element, and a tube guide member, with actuating means for moving these members from an upper level to a lower level. The closure applying member has the gripping element below the same and is movable in unison therewith from the upper level at which the gripping element receives a closure with a dip tube, to the lower level at which the gripping element releases the closure, and the applying member drives the closure onto a container fed in sequence into the location at which the applying member drives the closure onto the container. The gripping element and the tube guide member are provided with manipulative means for moving them into and out of operative relation with the closure and their dip tubes. Sequential operative means are provided for operating the various actuating and manipulative means in sequence with each other and with the containers being fed to the machine for capping. The sequence cycle is initiated either by the successive movement of individual containers into position for capping, or the sequence cycle is provided by timing element portions of the conveyor drive means. The principle advantages of such general features of my parent application are that valved dip tube closures are applied without flotation of the closures on the containers, thus avoiding the necessity of detents for functional attachment of the closure preliminarily to final affixing of the closure on the container and entrapped air or gas is released from the dip tubes by the applying member while driving the closure onto the container.

The dip tubes are readily and easily centered to the opening of the containers regardless of their configuration, orientation, and lengths of the dip tubes in a simple and economical way, and the dip tubes are held in place mechanically during insertion, at high rates of production regardless of the viscosity of the container contents or the absence of its contents or the completeness with which the container is filled.

This is all attained by said general features, as disclosed in my copending parent application, in a manner such that the curved dip tube closures are forcibly applied in a curved path rather than a straight line and by mechanisms all arranged in offset relation to, rather than in line with the containers. According to the present invention the aforesaid advantages and improvements are all attained by said general features in a novel way in which the closure applying member is forcibly driven between the upper and lower level, and in which the tube guide member moves gravitationally from its upper level to its lower level and is elevated to its upper level in latched engagement with the said forcibly driven closure applying member.

More specifically rectilinear guide means are provided for such straight line motions of the closure applying member and tube guide member for guiding the parts between their upper and lower levels. The manipulation of these parts is sequentially attained by cam and cam follower parts, cam operated pneumatic fluid valves, and cam operated switching elements for energizing or de-energizing electrical circuit portions of the invention.

In the accompanying drawings, there is shown, for purposes of exemplification, a preferred form and manner in which the general features of the invention of my parent copending application are employed to embody said general features in line in superposed relation for straight line operation of the closure applying member, gripping element and tube guiding member, rather than in offset relation through a curved path as in said aforesaid parent application, and with means for guiding the parts between the upper and lower levels in the form of stationary rectilinear shafts or rods and the operating means therefor in the form of stationary pneumatically operable piston cylinders, electrically operated solenoids with electrically operated and pneumatically operated timing means therefor. The invention however, is not limited in all its aspects to this mode of construction since the novel features of this invention may be used in other ways and for other uses, such as by means of a rotatable spindle rather than the rectilinear shafts, and with continuous rotating movement of the assembly with the containers during operation for applying closures to them as in my copending application, No. 346,501, also filed of even date, entitled Rotary Apparatus for Inserting Flexible Dip Tube Valves Into Containers, and with mechanical means in the form of cams and cam followers as in my said copending application as the means for sequential operation of the actuating means for moving the parts between their upper and lower levels rather than the pneumatic means and electrical timing means herein described as a preferred embodiment. Other means comprising valves mechanically and sequentially operated by cams on a motor driven spindle are also used to attain the movement of the parts between the upper and lower levels. Still other means comprising portions of the driving elements of the intermittently moving conveyor are also used to operate pneumatic valves or electrical switches or combinations thereof to attain the sequential movement of the parts between the upper and lower levels. Hence the invention in its broader aspects is not to be limited to the specific means and manner herein described as the preferred form by way of a specific embodiment for such inline construction and operation. Referring to the drawings in which the same numerals are used to indicate the same parts in each of the several views:

FIGURE 1 is a side view in elevation of one embodiment of this invention shown in position affixed in superposed relation to the frame of a conveyor for sequential movement of containers to be capped as indicated in dotted lines, and also illustrates means by which the endless belt portion of the conveyor is intermittently driven.

FIGURE 2 is a sectional view in elevation of FIGURE 1, taken along lines 2—2 thereof to illustrate an arrangement of cams affixed to the drive shaft of the conveyor in operational alignment with pneumatic valves and an electrical switch for the sequence operating means.

FIGURE 3 is a diagrammatic electrical diagram of the electrical circuit portion of the invention.

FIGURE 4 is a partial sectional view, in elevation, illustrating one type of curved dip tube closure used in the invention.

FIGURE 5 is a diagrammatic pneumatic diagram of the pneumatic circuit portion of the invention.

FIGURE 6 is a partial sectional view taken along lines 6—6 of FIGURE 2 illustrating the tube guide member in latched engagement with the closure applying member at their upper level, with a dip tubed closure slidably inserted in gripping element portions of the closure applying member, means for forcibly removing individual closures from an alignment thereof in a chute for insertion in said gripping elements, means for disengaging latch portions of the closure applying member from portions of the tube guide member.

FIGURE 7 is a front view in elevation of phantom line portions of FIGURE 8 and is taken along lines 7—7 thereof to illustrate in detail the relationship between tube guide member elements and closure applying member elements when said members are at their lower respective levels where the pressure applying member seats cap portions of the closure assembly onto the container opening: For reasons of clarity housing elements of the foregoing said members are omitted from this view.

FIGURE 8 is a view similar to FIGURE 6 illustrating tube guide portions of the tube guide member at a lower level surrounding regions of the closure dip tube extremity with the said tube guide member pendant on the closure applying member and also illustrating, in dotted lines, the tube guide member at its lowermost level and further illustrating, in dotted lines, an alignment of containers held in spaced relation by means of projecting elements on endless belt portions of the conveyor.

FIGURE 9 is a partial sectional plan view of FIGURE 2 taken along lines 8—8 thereof to illustrate in dotted lines an alignment of dip tube closures in a feed chute, means by which individual ones of said alignment are separated therefrom at an upper level in said chute for gravital descent therein to a lower level and further illustrating means provided for forcibly removing said individual closure from the chute to slidably insert the closure in gripping element portions of the closure applying member.

FIGURE 10 is a partial sectional plan view of the tube guide portions of the tube guide member and closure gripping elements of the closure applying member and is taken along lines 9—9 of FIGURE 6.

FIGURE 11 is a partial sectional view in elevation, taken along lines 10—10 of FIGURE 9 to illustrate the closure gripping elements and tube guide elements in related position when both are at their upper level position and also illustrates the opening cams for sequentially manipulating the said gripping and tube guide elements.

Referring to the drawings, FIGURES 1 and 2, the dip tube inserting machine 20 consists, in general, of a pair of main base plates 21 upstanding sides 22 and a transverse top plate 23 containing rectilinear vertical guide members in the form of stationary rods 24 and a pair of ribs for lateral alignment and vertical guidance of the closure applying member, the tube guide member and their respective elements in their movement in a straight line preferably vertically in line in superposed relation above a container 31 on a conveyor 32 in the area between the sides 22 and base plates 21.

The manipulative means 43 for the closure applying member 26 and its system of parts, and the tube guide member 29 and its system of parts is also superposed above and in line with the container 31 and is in the general form of a pneumatically motivated fluid pressure cylinder having a piston and rod 44 rectilinearly guided to move in a straight line in unison with the actuating means 33 for the pressure applying member 28 and the gripping element actuating cam 34. Of unitary construction the actuating means 33 comprising a rectilinear annularly shaped shank 61 (referring to FIGURES 6 and 7) at an upper level, a substantially rectangularly shaped cam portion 34 at a lower level, a rectilinear annular connecting post 62 at a lower level and terminating in an annularly shaped pressure applying member grooved to partially encompass the operating button 95 of the closure assembly 96 is slidably affixed to the closure applying member housing 36 by means of a collar 45 threadably affixed to the shank 61 of the actuating means 33 against the action of a compression spring 46 encompassing the said shank.

The actuating means 33 and the piston rod 44 of the cylinder 43 are in alignment and connected to each other by means of an extension rod 102 and coupling 101 for the purpose of adapting the piston stroke to containers of various heights with interchangeable rods 102. As will be seen in FIGURE 8, shoulder cam portions 34 of the actuating means 33 are in frictional engagement with recessed portions of the housing 36 under tension of the compressed spring 46 so that at its upper level the housing 36 is firmly positioned to align its system of parts for sequential operation of the latching and closure feed sequences.

Referring to FIGURES 8 and 9 the housing 36 superposed above the container 31 slidably journalled for vertical movement on one of the rods 24 is controlled for lateral alignment by grooved portions in slidable engagement with one of the rib 25 portions of the opposite side wall 22 and carries a system of parts comprising a pair of springs 98 loaded gripping elements 27 pendant within a recessed portion of the said housing with the gripping portions thereof below and in alignment with the pressure applying member portion 28 of the actuating means 33 and with abutting portions 35 thereof in interference relation with cam portions 34 of said means 33, and also comprises a tube jaw opening cam 38, a housing limit element 103, a tube length abutment shelf 39 and a tension spring 71 loaded latch 37 arcuately rotatable about a pin portion of said housing 36. The tube guide member housing 29 is arranged for slidable operation in a manner similar to that of the housing 36 on another rod 24 and rib 25 adjacent and to the rear of those already described as supporting elements for the closure applying member housing 36 and carries in unison with its vertical movement a system of parts comprising a pair of spring 97 loaded tube guide jaws 41 pendant on pin portions of said housing and arcuately rotatable thereon, against the action of said spring 97, a closure housing limit abutment 104, a tube length adjustable element 100, a container height gage element 40 and a latching pin 42. The foregoing member 29 and its system of parts are also in superposed relation to the container 31 on the conveyor 32 with guide sleeve portions 99 of the tube guide jaws 41 aligned with the container opening.

Referring to FIGURE 8 portions of the systems of parts comprising the closure applying member 26 and tube guide member 29 are arranged in interference relation with each other to obtain the sequence of operation necessary for applying dip tube closures to containers. As shown in FIGURE 8, the closure applying member 26 is shown in position at its upper level with the tube guide member 29 pendantly supported thereto by the latch 37 and the gripping elements 27 are aligned to slidably receive cap portions 93 of the closure assembly 96 from the feed chute 73 being held in this position at its upper level by fluid air pressure directed through the reversing port 43b against the piston, the housing limit element 103 is in superposed relation to the housing limit abutment portion 104 of the tube guide member housing 29, the tube length adjustable element 100 is aligned in superposed relation to the transverse top plate 23 of the apparatus.

The operating means for sequential operation of the latch 37 against the action of a tension spring 71 to disengage the tube guide member 29 from latched engagement with the closure applying member 26 comprises an electromagnetic solenoid 47, a solenoid linkage 48 a slide rod 49 and a slide rod tension spring 50. Referring to FIGURES 6 and 7, the horizontally disposed slide rod 49 is slidably disposed in journalled portions of a mounting plate 51 which transversly connects the sides 22 of the main bases 21. The solenoid 47 and linkage is set into operation against actions of a tension spring 50 to impinge the rod 49 extremity against the arcuately rotatable latch 37 under the action of a rotating cam 70 on the main drive shaft 66 of the conveyor against a momentary contact electrical switch 72 portion of the electrical circuit shown in FIGURE 3.

As seen in FIGURE 8, the release of individual closures from an alignment thereof in the feed chute 73 for gravitational descent of said closure therein from an upper level to the discharge portions of the chute at a lower level, is accomplished by the action of an escapement means 52 which is set into operation by a sensing element 60 portion of an electrical feed switch 54 that is initiated into action by the motion of a container 31 of a series in sequence on the belt 30 of the conveyor 32 to open the electrical circuit to a solenoid 53 portion of the closure escapement 52.

As seen in FIGURE 8, the sensing element is a lever 60 which operates in a horizontal plane through the action of a moving container 31 which when it moves past the lever 60 arcuately rotates it against actions of a tension spring (not shown) portion of said electrical switch, to open the electrical circuit. After the container has passed, the lever 60 is returned by the spring to the position shown in FIGURE 8 for a next actuation by the movement of a next container. When the switch 54 is opened as aforesaid, to break the circuit, electromagnetic forces induced by the energized circuit in the solenoid are released and the lower plunger 56 of the escapement enters the chute 73 under the action of a tension spring 57 to interrupt gravital descent of the alignment of closures in said chute. Simultaneously with entry of the escapement lower plunger 56 into the chute and into the normal path of descent of the said closure alignment, the upper plunger 55 is withdrawn. Each of the said plungers 56 and 55 are equidistant from the fulcrum of an arcuately rotatable lever 58 journalled on a support plate 52 portion of one side wall 22 of the frame 20 and each plunger is slidably journalled in apertured portions of the feed chute 73 at a corresponding upper and lower level.

As will be seen in FIGURES 2, 6 and 8, a feed cam 69 affixed to the drive shaft 66 of the conveyor operates the air valve 65 for the air cylinder 74 to reciprocate the transfer element 75 which first moves horizontally and inwardly towards the gripping elements 27 of the closure applying member 26 to allow rotation of an arcuately rotatable driver element 76 about its fulcrum 77 under the guidance of a stationary cam 78 portion of the transfer element 75 and under the action of a tension spring 80, to arcuately position the said driver 76 in regions below lower level portions of the feed chute 73 and in alignment with the area between the parallel guides 81 of the said chute 73 to impinge the individual closure 96 forcing it along the parallel guides of the feed chute so as to positively force cap portions 93 of the said closure 96 into the gripping elements 27 as shown in FIGURES 6 and 7. The driver element is returned to its normal position, as shown in FIGURE 8, by reversing the direction of the fluid pressure to the cylinder 74 by the action of the cam 69 against the four way valve 65. Referring to FIGURES 1 and 2, one embodiment of a conveyor is shown with electric motor driven cam shaft 66 which, in normal operation, is in continuous uninterrupted rotation with the aforedescribed cam elements 67, 68 and 70 keyed thereon for sequential operation and rotation in unison therewith. The said cam shaft is powered through a conventional system of belts, pulleys, and a speed reducer by an electric motor 82 in the electrical circuit as shown in FIGURE 3. An electrical control switch 83 is provided to energize the motor, and another main switch 84 is provided to control the entire electrical circuit. An eccentric arm 84 keyed to the cam shaft 66 of the conveyor imparts lineal intermittent motion to the endless belt 30 through the actions of a ratchet arm and ratchet 86 and connecting linkage 88. Referring to the drawings in general a consecutive series of projecting elements 89 in lineal spaced relation are affixed to the uppermost surface of the endless belt 30 for movement in unison therewith as means for maintaining a spaced relationship between individual containers on the belt 30 and parallel guide elements 90 on each side of the belt are provided as means for guiding each container into exact alignment as said container moves into position under the inserting machine 20 for capping. In operation, the conveyor cam shaft 66 is in continuous uninterrupted rotation and the cams 67, 68, 69 and 70 are arranged on the cam shaft in cyclic sequential relation to each other, and in cyclic relation to the eccentric arm 84 portion of the conveyor belt drive elements.

In normal uninitiated operating relation, the closure applying member 26 and its elements are in latched engagement with the tube guide member 29 and its elements at an upper level with gripper elements 27 of the closure member 26 aligned for slidable receipt of an individual closure from the discharge end of the feed chute 73 as shown in FIGURES 6 and 7. The tube guide jaw portions 41 of the tube guide member are arcuately separated from each other by the jaw opening cam 38 affixed to the applying member 26 to partially surround the gripping elements 27 of the member 26 as shown in FIGURE 10. The latch slide bar 49 is in spaced relation to the latch 37 portion of the member 26 and is maintained in such relation by the action of the tension spring portion 50 of the latching release apparatus. The position of the feed transfer element 75, the sensing lever 60 and the escapement elements 52 are as illustrated in FIGURE 8.

The following sequence of operations occur in consecutive order to accomplish the operations for inline inserting dip tube closures into containers.

The sequence of operations commences when a container 31 moves past the sensing lever 60 to arcuately rotate it against the action of a spring portion of a sensing switch 54 to de-energize the solenoid 53 which operates the closure escapement 52. The lower plunger 56 and the upper plunger of the escapement 52 operate in unison, with the former being rapidly withdrawn from interference with gravital descent of a closure at the lower level in the chute while the later rapidly enters the gravital path of the ensuing alignment of closures to interrupt their further gravital descent within the parallel guide portions of the chute.

Secondly, the individual closure is slidably transferred from lower level portions of the guide chute 73 and forced into the gripping elements 27 by the action of the feed cam 69 against the air valve 65 which opens said valve to direct fluid air pressure to the infeed port 91 of the air cylinder 74 which forces the driver element 76 forward arcuately rotating the said driver element 76 in the manner hereinbefore described, after which said driver element continues in its path of forward movement inline with and between the parallel guides of the chute 73 impinging cap portions of the closure assembly and slidably forcing said cap portions into the gripping elements 27 of the closure applying member 26 whereupon cam 69 actuates air valve 65 to reverse the air valve porting to direct the fluid air pressure from the infeed port 91 of the cylinder 74 to the opposite port 92 to return the transfer element to its normal position as shown in FIGURE 8.

Thirdly, the latch slide bar 49 impinges the latch 37 arcuately rotating the latch 37 from engagement with the latch pin portion 42 of the tube guide member 29 and is returned to normal position as shown in FIGURE 6 by the action of the tension spring 50 affixed to the linkage 48 of the latch tripping mechanism 48. Said actuation of the slide bar 49 in its impingement against the latch 37 is accomplished when the latching cam 70 on the cam shaft 66 sequentially actuates the switch 72 in the electric circuit to energize the latch solenoid 47 the electromagnetic forces of which force the solenoid plunger from an upper level (as shown in FIGURE 6) to a lower level (as shown in FIGURE 7) to force the slide bar slidable in its front plate 51 journal through an interconnecting linkage 48 to act against the latch in the manner described.

Fourthly, with the latch 37 disengaged from latchpin 42 portions of the tube guide member 29 said member 29 and its aforedescribed elements, gravitationally moves from its normal position at its upper level to a lower level where further gravitational movement is interrupted by interference be of abutment portions 39 of the closure applying member housing 36 with the tube length gage bar portions 100 of the tube guide member 29. During said gravitational movement of the tube guide member 29, sleeve portions 99 of the tube guide jaws 41 encompass portions of the closure dip tube 92 beneath cap portions 93 thereof and slide downwardly along the tube length straightening said tube and aligning its extremity with the container opening. Being threadably affixed to portions of the tube guide housing 29 the tube length gage 100 is adjustable so that said interrupted gravitational movement of the tube jaws 41 in unison with the housing 29 is adjustably set to occur when sleeve portions 99 of the jaws 41 substantially encompass the dip tube in regions of the dip tube extremity. From FIGURE 8, it will be seen that the tube guide member 29 and its elements are substantially pendant on abutment portions 39 of the closure applying member housing 36 and are in slidible relation to the rod 24 and rib 25 for controlled vertical and lateral alignment during said gravitational movement. Further gravitational movement of the member 29 pendent on the housing 26 occurs in unison with subsequent movement of the housing 26 as described in the fifth sequential operation following, and further gravitational movement of the said member 26 and its elements are interrupted at a lower lever by the interference of container height gage portions 40 of the closure guide member 29 with surface portions of the upper transverse plate 23 connecting the side walls 22 of the machine 20.

Fifthly, pneumatic pressure is redirected from the reversing port 43b to the infeed port 43a of the pneumatic cylinder means 43 by the interactions of cams 68 and 67 with valves 63 and 64 respectively to forcibly move the manipulative means 33, piston rod 44, coupling 101, extension 102 and the closure applying member housing 36 from their corresponding positions at an upper level to a lower level with movement of said manipulative means being transmitted to the housing against the action of the spring 61 element of the closure applying member 26 and nut 45 threadably affixed to the manipulative means. With the tube guide member 29 and its elements pendant on the transverse plate 23 and in guiding relation with dip tube portions 92 as previously described, further movement of the closure applying member housing 36 is interrupted by interference of housing 36 stop portions 103 with projecting element portion 104 of the pendant member 26 while the manipulative means 33 and cam 34 and pressure applying means 28 continue uninterruptedly to a lower level to force dip tube portions 92 of the closure assembly into the container and to force cap portions of the closure 93 onto the container opening and to depress the closure valve operating button 95 releasing air or gas entrapped in said tube 92. As will be seen diagrammatically in FIGURE 7, the tube guide jaws 41 are moved out of the path of descent of the applying member 28 and gripping elements 27 and out of guiding relation with the dip tube of a contained closure by the cam 38 element of the member 26 against the action of jaw spring 97 during movement of the housing 36 portion of the closure applying member 26 from its normal position at an upper level to a lower level and that the gripping elements 27 pendantly supported by closure applying element housing portions are moved out of the path of descent of the pressure applying element 28 against the action of a tension spring 98 to release cap portions 93 of the closure assembly to the action of the pressure applying member in forcing the said cap onto the container opening. This is accomplished by the interference of cam portions 35 of the pendant gripper elements 27 with cam 34 portions of the manipulative means 33 as the said means 33 moves downwardly in the manner descirbed.

As the closure applying member 26 approaches its said lower level of movement, latch 37 portions thereof frictionally engage the latch pin 42 under the action of the tension spring 71 for elevation of the tube guide member 29 and its elements in unison with the closing applying member 36 and its elements to their respective positions at the upper level after the operation of inserting a dip tube closure into a container is accomplished. Said elevation of both aforesaid members 26 and 36 in unison with each other is accomplished when fluid pneumatic pressure is re-directed from the intake port 43a of the cylinder 43 to the reversing port 43b thereof.

For adjustably adapting the inserting machine for inserting closure assemblies with dip tubes of various lengths into containers of various heights, the dip tube length gage bar 100 and container height gage 40 are threadably affixed to portions of the tube guide member housing 29. It is to be noted in FIGURE 8, that initial interruption of the gravitational movement of the tube guide member 29 occurs when sleeve portions 99 of the tube guide jaws 41 encompass the dip tube 92 in regions of the extremity thereof and that said interruption is set to occur in this region according to the dip tube length by adjustment of the bar 100.

It is also to be noted that the container height gage 40 limits the movement of the guide jaws 41 to their lower level in regions above the container opening in aligned and superposed relation thereto for guiding the dip tube extremity into said opening. With interchangeable cam 38 and latch 37 adjustable elements 40 and 100 and 103 the inserting machine 20 is operable for guiding dip tubes partially into the container and for release of cap portions of said closure assembly from the gripping elements in regions above the container opening for gravitational placement of the closure cap 93 onto the container opening.

I claim:

1. Inline apparatus for inline assembling a consecutive succession of individual dip tube valves having a cap and an axially pendant dip tube to individual ones of a consecutive succession of an alignment of vertically disposed partially filled containers in spaced relation to each other on a horizontally disposed endless belt conveyor which transports said containers in successive periods of interrupted lineal motions, said apparatus comprising, in combination: an upright frame adapted to be surmounted in position over stationary elements of a horizontally disposed transverse endless belt conveyor movable in alternating periods of motion and rest as as aforesaid; a plurality of vertically disposed horizontally spaced apart guide rail means supported in said frame; an assembly unit, mounted in said frame for rectilinear movement between an upper level and a lower level, comprising resilient gripping elements for slidably receiving and grasping cap portions of individual valves force from an alignment thereof in an alignment chute at an upper level for movement of said valves from said upper level to a lower level for slidably assuming portions of said cap into a container opening, manipulative means in the form of a cam and a pressure applying element movable in unison with said gripping elements for opening said gripping elements at said lower level to release said cap to the following action of said presure applying element for pressing the cap onto a container opening; and a tube guide member mounted in said frame for movement at said upper level into partially surrounding relation with dip tube portions of the valve grasped by said gripping elements at said upper level and movable down along said dip tube to the extremity thereof at said lower level forcing said extremity into substantial alignment with said container opening, means for effecting movement of said dip tube guide member in unison with said assembly unit and said valve to still a lower level above said container opening, means for moving said tube elements out of the path of said movement of said gripping elements and said pressure applying member after extremity portions of the valve dip tube are guided substantially into said container, and operating means comprising one of the group consisting of pneumatically powered cylinders, cam operated air valves, solenoids, and cam operated electrical switches for driving said assembly unit and said tube guide member in assembling a dip tube valve to a container.

2. Apparatus as claimed in claim 1 and which includes said alignment chute having escapement means actuated by individual containers on said conveyor to release individual valves from an alignment thereof at an upper level in said alignment chute for the decent by gravity of said individual valve to lower level discharge portions of said chute.

3. Apparatus as claimed in claim 1 and which includes transfer means affixed to said frame positioned thereon for transfer of an individual valve from discharge portions of said alignment chute to said gripping lements when said gripping elements are in feeding position at said upper level.

4. Apparatus as claimed in claim 1 and which includes means for adapting said apparatus to be operable for assembling dip tube valves to containers, the said valves having dip tubes of varying lengths, said means comprising adjustable limiting elements for limiting different lengths of said movements of said assembly unit and said tube guide member.

5. Apparatus as claimed in claim 1 and in which said gripping elements comprise a pair of horizontally disposed arcuately rotatable jaw elements urged toward each other by the action of a tension spring, the said jaws being shaped to slidably receive and grasp peripheral portions of the valve cap below the sealing lip configurations of said cap.

6. Apparatus for assembling dip tube valves to containers comprising, in combination: an assembly unit comprising a valve applying member, and a tube guide member, mounted for movement between an upper level at which a valve is to be received to a lower level above a container opening at which the applying member is to drive the dip tube into and the valve cap onto said container, said valve applying member comprising an upper valve cap pressure applying element and a lower valve cap gripping element in position below the applying member to receive a valve with a dip tube at said upper level for transfer to said container at said lower level, said tube guide member being operable at said upper level to gravitately move into guiding relation with a dip tube on a valve cap being grasped by said gripping element at said upper level and to be gravitately moved down along to the extremity of said tube to guide said tube extremity in position to enter a container aligned with the assembly unit, actuating means for moving said valve applying member between said upper and lower levels, and for moving said tube guide member between said lower to upper level in unison therewith, and means for triggering said tube guide member for gravitational movement from said upper level to said dip tube extremity at a lower level, pendant means for lowering said tube guide member in unison with said valve applying member, and said valve and said tube guide member in unison to a lower level, and sequence control operating means for moving the actuating means in a predetermined sequence.

7. Apparatus as claimed in claim 6 and in which said gripping elements comprise a pair of horizontally disposed arcuately rotatable jaw elements urged toward each other by the action of a tension spring, the said jaws being shaped to slidably receive and grasp peripheral portions of the valve cap below the sealing lip configurations of said cap.

8. Apparatus as claimed in claim 6 and in which the sequence control operating means comprise cams and cam operated air valves and electrically operated solenoids and solenoids linkages attached to the respective actuating means to operate same.

9. Apparatus as claimed in claim 6 and which the said actuating means comprises air cylinder elements.

10. Apparatus as claimed in claim 6 and which includes means for adapting said apparatus to be operable for assembling dip tube valves to containers, the said valves having dip tubes of varying lengths, said means comprising adjustable limiting elements for limiting different lengths of said movements of said valve applying member and said tube guide member.

11. Apparatus as claimed in claim 6 and in which the sequence control operating means includes separating means operable to move the tube guide member out of the path of the gripping element and to move the gripping element out of the path of the pressure applying element at their said lower levels, for passage of the gripping element past the tube guide member for seating a valve onto a container and for passage of the pressure applying element past the gripping element in applying pressure to the valve cap on a container after the gripping element releases the valve upon being moved out of the way.

12. Apparatus as claimed in claim 11 and in which said separating means comprises cams and cam followers.

References Cited by the Examiner

UNITED STATES PATENTS

| | | | |
|---|---|---|---|
| 2,810,249 | 10/57 | Wysocki | 53—319 X |
| 2,914,843 | 12/59 | Petersen | 29—203 |
| 2,949,665 | 8/60 | Bergsland et al. | 29—203 |
| 3,118,218 | 1/64 | Gleason et al. | 29—211 X |

WHITMORE A. WILTZ, *Primary Examiner.*

THOMAS H. EAGER, *Examiner.*